United States Patent
Hai

(10) Patent No.: US 12,422,704 B2
(45) Date of Patent: Sep. 23, 2025

(54) OPTICAL PROPERTY DETECTING METHOD OF LIQUID CRYSTAL DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventor: Bo Hai, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/758,222

(22) PCT Filed: Jun. 6, 2022

(86) PCT No.: PCT/CN2022/097147
§ 371 (c)(1),
(2) Date: Nov. 23, 2023

(87) PCT Pub. No.: WO2023/221192
PCT Pub. Date: Nov. 23, 2023

(65) Prior Publication Data
US 2024/0219756 A1 Jul. 4, 2024

(30) Foreign Application Priority Data
May 17, 2022 (CN) .......................... 202210539457.4

(51) Int. Cl.
*G01M 11/02* (2006.01)
*G02F 1/13* (2006.01)

(52) U.S. Cl.
CPC ........... *G02F 1/1309* (2013.01); *G01M 11/02* (2013.01)

(58) Field of Classification Search
CPC ........................... G02F 1/1309; G01M 11/02
(Continued)

(56) References Cited

U.S. PATENT DOCUMENTS 9,489,876 B2 * 11/2016 Liu .................. G09G 3/006
9,546,926 B2 * 1/2017 Ji .......................... G01J 1/42
(Continued)

FOREIGN PATENT DOCUMENTS

| CN | 1773301 A | 5/2006 |
|---|---|---|
| CN | 103940832 A | 7/2014 |

(Continued)

OTHER PUBLICATIONS

International Search Report in International application No. PCT/CN2022/097147, mailed on Dec. 29, 2022.
(Continued)

*Primary Examiner* — Isiaka O Akanbi
(74) *Attorney, Agent, or Firm* — PV IP PC; Wei Te Chung

(57) ABSTRACT

An optical property detecting method of a liquid crystal display panel is provided, and includes: measuring a spectrum of a first backlight panel and a spectrum of the a liquid crystal module; calculating a transmission spectrum of a target liquid crystal display panel; obtaining a spectrum of a second backlight panel; calculating and obtaining a tristimulus value of a second liquid crystal module; obtaining a plurality of optical parameters corresponding to the target liquid crystal display panel according to the tristimulus value, so as to detect an optical property of the target liquid crystal display panel.

11 Claims, 1 Drawing Sheet

(58) Field of Classification Search
USPC .......................................................... 356/124
See application file for complete search history.

(56) References Cited

U.S. PATENT DOCUMENTS

| | | | | |
|---|---|---|---|---|
| 9,625,763 | B2* | 4/2017 | Hai | .................... G02F 1/133634 |
| 9,638,958 | B2* | 5/2017 | Hai | ..................... G02F 1/13363 |
| 2009/0115714 | A1* | 5/2009 | Jeong | ................ G02F 1/133604 |
| | | | | 345/88 |
| 2009/0224777 | A1* | 9/2009 | Kim | ...................... G02F 1/1309 |
| | | | | 702/58 |
| 2011/0261263 | A1 | 10/2011 | Schoenfeld | |
| 2012/0013819 | A1* | 1/2012 | Son | ........................ G02F 1/1309 |
| | | | | 349/61 |
| 2014/0009961 | A1* | 1/2014 | Sakaguchi | ................ F21V 7/04 |
| | | | | 362/342 |
| 2016/0187697 | A1* | 6/2016 | Hai | ................... G02F 1/133634 |
| | | | | 349/119 |
| 2016/0379577 | A1 | 12/2016 | Han | |
| 2021/0364863 | A1* | 11/2021 | Zheng | ............... G02F 1/133624 |

FOREIGN PATENT DOCUMENTS

| | | |
|---|---|---|
| CN | 103955079 A | 7/2014 |
| CN | 105424726 A | 3/2016 |
| CN | 105954893 A | 9/2016 |
| CN | 109445134 A | 3/2019 |
| CN | 109901314 A | 6/2019 |
| CN | 111256826 A | 6/2020 |
| CN | 111812869 A | 10/2020 |
| JP | 2006113138 A | 4/2006 |

OTHER PUBLICATIONS

Written Opinion of the International Search Authority in International application No. PCT/CN2022/097147, mailed on Dec. 29, 2022.

Chinese Office Action issued in corresponding Chinese Patent Application No. 202210539457.4 dated Jan. 5, 2023, pp. 1-6.

* cited by examiner

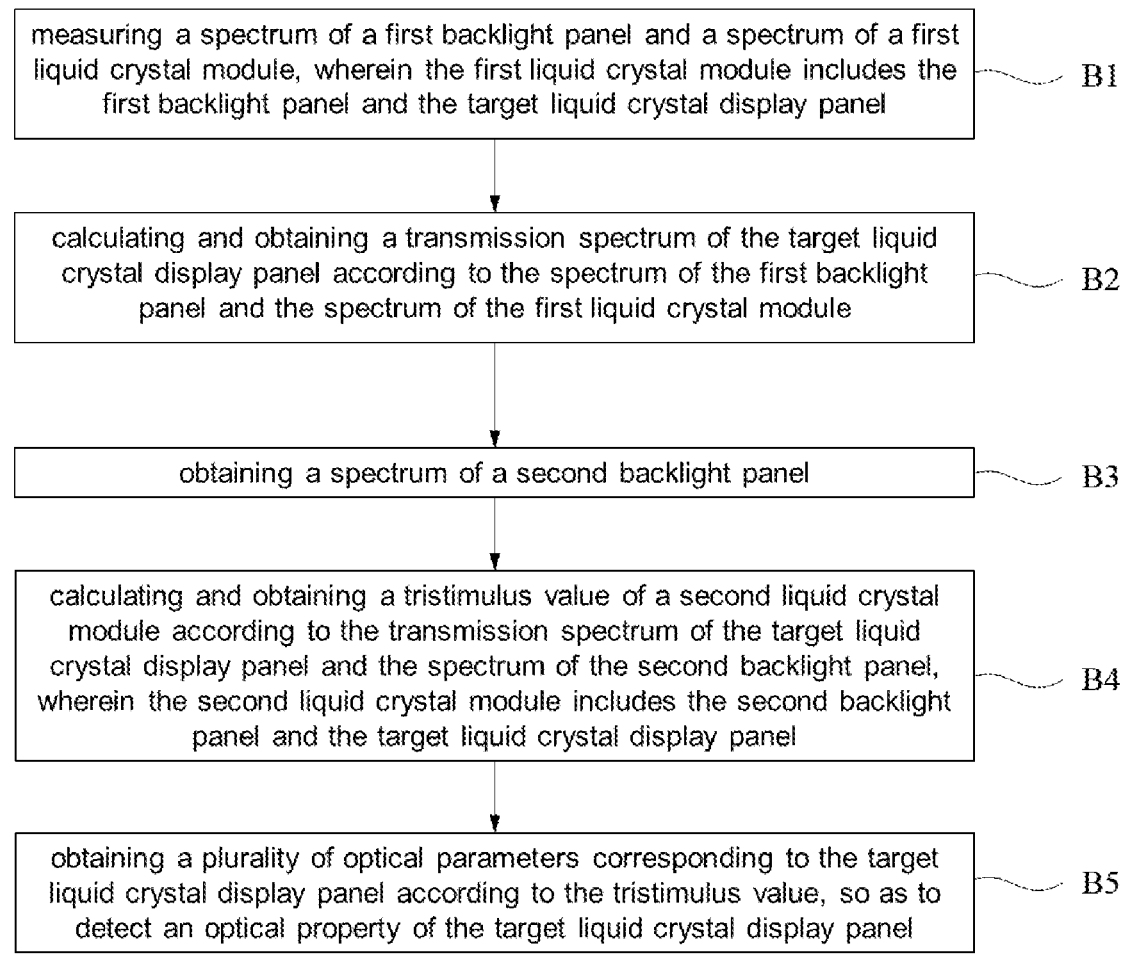

OPTICAL PROPERTY DETECTING METHOD OF LIQUID CRYSTAL DISPLAY PANEL

FIELD OF DISCLOSURE

The present disclosure relates to the field of display technology, and more particularly, to an optical property detecting method of a liquid crystal display panel.

BACKGROUND OF DISCLOSURE

For a liquid crystal display device, a liquid crystal cell and a backlight panel are usually manufactured by different manufacturers, and optical properties of the liquid crystal cell are obtained by measuring a liquid crystal module (the liquid crystal cell+the backlight panel).

A manufacturer of the liquid crystal cell cannot obtain the backlight panel in advance, so that the backlight panel and the liquid crystal cell produced by itself are usually adopted for assembling a temporary liquid crystal module to detect the optical properties of the liquid crystal cell. Results of a detection as such are quite different from actual results. In order to obtain accurate measurement results, the liquid crystal cell is required to be transported to a manufacturer of the backlight panel for assembly, and then returned to the manufacturer of the liquid crystal cell for measurement, which is time-consuming and labor-intensive, resulting in a low development efficiency of the liquid crystal cell.

The present application provides an optical property detecting method of a liquid crystal display panel, which simplifies an optical property detecting process of the liquid crystal display panel, reduces a measurement error, and increases a development efficiency of the liquid crystal display panel.

SUMMARY

The present application provides an optical property detecting method of a liquid crystal display panel for detecting an optical property of a target liquid crystal display panel. The optical property detecting method of the liquid crystal display panel including:

Optionally, in some embodiments of the present application, a step of measuring the spectrum of the first backlight panel and the spectrum of the first liquid crystal module includes:
  measuring the spectrum of the first backlight panel; and
  measuring a corresponding spectrum of the first liquid crystal module when displaying a target color.

Optionally, in some embodiments of the present application, a step of calculating and obtaining the transmission spectrum of the target liquid crystal display panel according to the spectrum of the first backlight panel and the spectrum of the first liquid crystal module includes:
  dividing the corresponding spectrum of the first liquid crystal module when displaying the target color by the spectrum of the first backlight panel to obtain a corresponding transmission spectrum of the target liquid crystal display panel when displaying the target color.

Optionally, in some embodiments of the present application, the target color includes red, green, and blue, and a step of dividing the corresponding spectrum of the first liquid crystal module when displaying the target color by the spectrum of the first backlight panel to obtain the corresponding transmission spectrum of the target liquid crystal display panel includes:
  dividing the corresponding spectrum of the first liquid crystal module when displaying red by the spectrum of the first backlight panel to obtain a corresponding red transmission spectrum of the target liquid crystal display panel when being penetrated by red light;
  dividing the corresponding spectrum of the first liquid crystal module when displaying green by the spectrum of the first backlight panel to obtain a corresponding green transmission spectrum of the target liquid crystal display panel when being penetrated by green light; and
  dividing the corresponding spectrum of the first liquid crystal module when displaying blue by the spectrum of the first backlight panel to obtain a corresponding blue transmission spectrum of the target liquid crystal display panel when being penetrated by blue light.

Optionally, in some embodiments of the present application, the target color includes red, green, and blue, and the step of dividing the corresponding spectrum of the first liquid crystal module when displaying the target color by the spectrum of the first backlight panel to obtain the corresponding transmission spectrum of the target liquid crystal display panel further includes:
  dividing the corresponding spectrum of the first liquid crystal module when displaying white by the spectrum of the first backlight panel to obtain a corresponding white transmission spectrum of the target liquid crystal display panel when being penetrated by white light.

Optionally, in some embodiments of the present application, a step of calculating and obtaining the tristimulus value of the second liquid crystal module according to the transmission spectrum of the target liquid crystal display panel and the spectrum of the second backlight panel includes:
  substituting the transmission spectrum of the target liquid crystal display panel and the spectrum of the second backlight panel into a calculation model, and calculating to obtain the tristimulus value of the second liquid crystal module; wherein the tristimulus value includes a red primary color stimulus value, a green primary color stimulus value, and a blue primary color stimulus value, and the calculation model is:

$$X = K \int_\lambda S(\lambda) \cdot \rho(\lambda) \cdot \bar{x}(\lambda) d\lambda;$$

$$Y = K \int_\lambda S(\lambda) \cdot \rho(\lambda) \cdot \bar{y}(\lambda) d\lambda; \text{ and}$$

$$Z = K \int_\lambda S(\lambda) \cdot \rho(\lambda) \cdot \bar{z}(\lambda) d\lambda;$$

wherein, the X is the red primary color stimulus value, the Y is the green primary color stimulus value, the Z is the blue primary color stimulus value, the K is a known coefficient, the $S(\lambda)$ is the spectrum of the second backlight panel, the $\rho(\lambda)$ is the transmission spectrum of the liquid crystal display panel, the $\lambda$ is the wavelength, and the $\bar{x}(\lambda)$, $\bar{y}(\lambda)$, and $\bar{z}(\lambda)$ are CIE1931 standard colorimetric observer color matching functions.

Optionally, in some embodiments of the present application, the step of calculating and obtaining the tristimulus value of the second liquid crystal module according to the transmission spectrum of the target liquid crystal display panel and the spectrum of the second backlight panel includes:
  substituting the red transmission spectrum of the target liquid crystal display panel and the spectrum of the second backlight panel into the calculation model, and obtaining a corresponding tristimulus value of the second liquid crystal module when displaying red;

substituting the green transmission spectrum of the target liquid crystal display panel and the spectrum of the second backlight panel into the calculation model, and obtaining a corresponding tristimulus value of the second liquid crystal module when displaying green; and substituting the blue transmission spectrum of the target liquid crystal display panel and the spectrum of the second backlight panel into the calculation model, and obtaining a corresponding tristimulus value of the second liquid crystal module when displaying blue.

Optionally, in some embodiments of the present application, the step of calculating and obtaining the tristimulus value of the second liquid crystal module according to the transmission spectrum of the target liquid crystal display panel and the spectrum of the second backlight panel further includes:

substituting the white transmission spectrum of the target liquid crystal display panel and the spectrum of the second backlight panel into the calculation model, and obtaining a corresponding tristimulus value of the second liquid crystal module when displaying white.

Optionally, in some embodiments of the present application, a step of obtaining the plurality of optical parameters corresponding to the target liquid crystal display panel according to the tristimulus value includes:

calculating a value of a luminance parameter and a value of a chrominance parameter according to a mathematical relationship between the tristimulus value and the luminance parameter and the chrominance parameter, and the mathematical relationship is:

$$x = X/(X + Y + Z); \text{ and}$$
$$y = Y/(X + Y + Z);$$

wherein the Y is both the green primary color stimulus value and the luminance parameter, the x is a coordinate parameter of an x-axis of a chrominance, and the y is a coordinate parameter of a y-axis of the chrominance.

Optionally, in some embodiments of the present application, after a step of calculating the value of the luminance parameter and the value of the chrominance parameter according to the mathematical relationship between the tristimulus value and the luminance parameter and the chrominance parameter, the optical property detecting method further includes:

obtaining a transmittance, a contrast ratio, a color saturation, and a color gamut of the liquid crystal display panel according to a value of a brightness parameter and a value of the chrominance parameter, so as to detect the optical property of the liquid crystal display panel.

Optionally, in some embodiments of the present application, a step of obtaining the spectrum of the second backlight panel includes:

directly obtaining data of the spectrum of the second backlight panel; or measuring the second backlight to obtain the data of the spectrum of the second backlight panel.

The present application provides the optical property detecting method of the liquid crystal display panel. By establishing a simulation calculation model and utilizing the simulation calculation model, the optical property detecting method can calculate the optical parameters of the target liquid crystal display panel, and detect and evaluate the optical properties of the target liquid crystal display panel under a condition that the spectrum of the second backlight panel is known, without obtaining the spectrum of the second backlight panel, and transporting the target liquid crystal display panel for assembly and measurement with the second backlight panel, which simplifies an optical property detecting process of the liquid crystal display panel, reduces a detecting time of the optical properties of the liquid crystal display panel, reduces a measurement error, and increases a development efficiency of the liquid crystal display panel.

BRIEF DESCRIPTION OF DRAWINGS

The following describes specific embodiments of the present application in detail with reference to the accompanying drawings, which will make technical solutions and other beneficial effects of the present application obvious.

FIG. 1 is a flowchart of an optical property detecting method of a liquid crystal display panel provided by an embodiment of the present application.

DETAILED DESCRIPTION OF PRESENT EMBODIMENTS

When human eyes watch an image of the liquid crystal display panel, what a radiant flux of light is received, and what the human eyes eventually perceive are photometric quantities such as color and brightness of the image. The radiant flux is an intrinsic property of light, and the photometric quantities are quantitative parameters based on human vision of the radiant flux after passing through the human eyes. A certain conversion relationship is between the radiant flux and the photometric quantities. Through utilizing the conversion relationship, a corresponding one of the photometric quantities can be obtained through calculating the radiant flux, so as to evaluate a display effect of the liquid crystal display panel from a perspective of human visual perspective.

Various optical parameters (i.e., the photometric quantities) that reflect optical properties of the liquid crystal display panel can be calculated and obtained from basic optical parameters of the liquid crystal display panel-corresponding chrominance coordinate values x and y and a corresponding brightness Y when the liquid crystal display panel displays different colors. Therefore, through obtaining the corresponding chrominance coordinate values x and y and the corresponding brightness Y when the liquid crystal display panel displays different colors, various optical parameters of the liquid crystal display panel can be calculated, and then the optical properties of the liquid crystal display panel can be detected and evaluated.

A color is represented by the brightness and the chrominance together. The chrominance is a property of the color exclusive of the brightness, which reflects a hue and a saturation of the color. The chrominance is a comprehensive amount of the hue and a purity, which is usually expressed by chrominance coordinates. In a CIE1931-RGB color system, a chrominance coefficient refers to a ratio of a stimulus of a primary color to a total stimulus of three primary colors. A stimulus of the three primary colors is a tristimulus value, including a red primary color stimulus value, a green primary color stimulus value, and a blue primary color stimulus value. A mathematical relationship between the chrominance coordinates and corresponding tristimulus values are:

$$x = X/(X + Y + Z); \text{ and} \tag{1}$$
$$y = Y/(X + Y + Z).$$

The X is the red primary color stimulus value, the Y is the green primary color stimulus value, and the Z is the blue primary color stimulus value. The x is a coordinate parameter of an x-axis of the chrominance, and the y is a coordinate parameter of a y-axis of the chrominance. A green light is a medium wave, a blue light is a short wave, and a red light is a long wave. The human eyes cannot see longer or shorter electromagnetic waves. Under a same light intensity, the human eyes are more sensitive to green and feel that green light is brighter than red or blue light. Based on this fact, the International Commission on Illumination (CIE) defines the green primary color stimulus value Y as a brightness value corresponding to the color.

It can be seen from the above-mentioned mathematical relationship (1) that if corresponding tristimulus values are obtained when the liquid crystal display panel to be detected displays different colors, the corresponding brightness Y of the liquid crystal display panel when displaying different colors can be obtained, and the above-mentioned mathematical relationship can be utilized to obtained the corresponding chrominance coordinate values x and y by calculation, so that various optical parameters of the liquid crystal display panel are obtained by calculation, and the optical properties of the liquid crystal display panel are detected and evaluated.

Tristimulus values represent a degree of stimulation of the three primary colors that cause a retina to perceive a color, and specifically to a color of an object. A tristimulus value is an amount of three stimuli required to match a color, which is determined and comprehensively calculated from a spectral distribution of the object and a standard observer data, and a specific calculation formula of the tristimulus value is:

$$X = K \int_\lambda P(\lambda) \cdot \overline{x}(\lambda) d\lambda; \tag{2}$$
$$Y = K \int_\lambda P(\lambda) \cdot \overline{y}(\lambda) d\lambda; \text{ and}$$
$$Z = K \int_\lambda P(\lambda) \cdot \overline{z}(\lambda) d\lambda.$$

The K is a known coefficient, specifically a maximum spectral luminous efficacy of a photopic vision (683 lumens/watt). The $P(\lambda)$ is a spectrum of the object. The $\overline{x}(\lambda)$, $\overline{y}(\lambda)$, and $\overline{z}(\lambda)$ are CIE1931 standard colorimetric observer color matching functions. The $\lambda$ is a wavelength.

For the liquid crystal display panel, since the optical properties of the liquid crystal display panel are detected by a liquid crystal module including the liquid crystal display panel and the backlight panel, when the above-mentioned calculation formula of the tristimulus value is applied to embodiments of the present application, the $P(\lambda)$ is the spectrum of the liquid crystal module, and the spectrum of the liquid crystal module depends on a transmission spectrum of the liquid crystal display panel and the spectrum of the backlight panel, that is:

$$P(\lambda) = S(\lambda) \cdot \rho(\lambda). \tag{3}$$

The $P(\lambda)$ is the spectrum of the liquid crystal module, the $S(\lambda)$ is the spectrum of the backlight panel, and the $\rho(\lambda)$ is the transmission spectrum of the liquid crystal display panel.

Through substituting the above-mentioned formula (3) into the above-mentioned calculation formula (2), a calculation model of the tristimulus value corresponding to the liquid crystal module is obtained:

$$X = K \int_\lambda S(\lambda) \cdot \rho(\lambda) \cdot \overline{x}(\lambda) d\lambda; \tag{4}$$
$$Y = K \int_\lambda S(\lambda) \cdot \rho(\lambda) \cdot \overline{y}(\lambda) d\lambda; \text{ and}$$
$$Z = K \int_\lambda S(\lambda) \cdot \rho(\lambda) \cdot \overline{z}(\lambda) d\lambda.$$

Only the transmission spectrum of the target liquid crystal display panel to be detected and a spectrum of the target backlight panel are required, and without obtaining the spectrum of the target backlight panel, the tristimulus value of the target liquid crystal module can be calculated by the above-mentioned calculation model (4). Therefore, through the above-mentioned mathematical relationship (1), the corresponding brightness Y, the chrominance coordinate values x and y can be obtained, so as to detect and evaluate the optical properties of the liquid crystal display panel.

Based on the above-mentioned principles, the present application provides an optical property detecting method of a liquid crystal display panel. By establishing a simulation calculation model, the simulation calculation model can be utilized to calculate the optical parameters of the target liquid crystal display panel, and utilized to test and evaluate the optical properties of the target liquid crystal display panel under a condition that the spectrum of the target backlight panel is known, without obtaining the spectrum of the target backlight panel, and transporting the target liquid crystal display panel for assembly and measurement with the target backlight panel, which simplifies an optical property detecting process of the liquid crystal display panel, reduces a detecting time of the optical properties of the liquid crystal display panel, reduces a measurement error, and increases a development efficiency of the liquid crystal display panel. The optical property detecting method of the liquid crystal display panel provided by embodiments of the present application will be described in detail below through specific embodiments.

In an embodiment, referring to FIG. 1, FIG. 1 shows a flowchart of the optical property detecting method of the liquid crystal display panel provided by an embodiment of the present application. The optical property detecting method includes the following step:

Step B1: measuring the spectrum of the first backlight panel and the spectrum of the first liquid crystal module, wherein the first liquid crystal module includes the first backlight panel and the target liquid crystal display panel.

In an embodiment of the present application, the target liquid crystal display panel is the liquid crystal display panel whose optical properties are to be detected. The first backlight panel refers to a backlight panel produced by a liquid crystal display panel manufacturer that can be easily obtained by itself, or a backlight panel that can be purchased or introduced in the market by other manufacturers. The first liquid crystal module is assembled by the target liquid crystal display panel and the first backlight panel. A spectrum analyzer can be adopted to perform a spectrum measurement on the first backlight panel and the first liquid crystal module to obtain corresponding spectrum data. The spectrum data includes: a spectrum of the first backlight panel when emitting light, and a spectrum corresponding to the first liquid crystal module when displaying different colors, including a red spectrum corresponded to when displaying red, a green spectrum corresponded to when displaying green, and a blue spectrum corresponded to when displaying blue, by the first liquid crystal module. Furthermore, when the target liquid crystal display module also displays white, the first liquid crystal module further includes a corresponding white spectrum when displaying white.

Step B2: calculating and obtaining the transmission spectrum of the target liquid crystal display panel according to the spectrum of the first backlight panel and the spectrum of the first liquid crystal module.

The first liquid crystal module is assembled by the target liquid crystal display panel and the first backlight panel. The spectrum of the first liquid crystal module, the transmission spectrum of the target liquid crystal display panel and the spectrum of the first backlight panel satisfies the above-mentioned formula (3). Therefore, the transmission spectrum $\rho(\lambda)$ of the target liquid crystal display panel can be obtained through having the spectrum $P1(\lambda)$ of the first liquid crystal module divided by the spectrum $S1(\lambda)$ of the first backlight panel. That is:

$$\rho(\lambda) = P1(\lambda)/S1(\lambda). \qquad (5)$$

Similarly, the transmission spectrum $\rho(\lambda)$ of the target liquid crystal display panel includes a red transmission spectrum $\rho_R(\lambda)$ corresponding to a red light transmitted through the target liquid crystal display panel, a green transmission spectrum $\rho_G(\lambda)$ corresponding to a green light transmitted through the target liquid crystal display panel, and a blue transmission spectrum $\rho_B(\lambda)$ corresponding to a blue light transmitted through the target liquid crystal display panel. Furthermore, a white transmission spectrum $\rho_W(\lambda)$ corresponding to a white light transmitted through can be further included. The red transmission spectrum $\rho_R(\lambda)$ is obtained by dividing the red spectrum of the first liquid crystal module by the spectrum of the first backlight panel, the green transmission spectrum $\rho_G(\lambda)$ is obtained by dividing the green spectrum of the first liquid crystal module by the spectrum of the first backlight panel, the blue transmission spectrum $\rho_B(\lambda)$ is obtained by dividing the blue spectrum of the first liquid crystal module by the spectrum of the first backlight panel, and the white transmission spectrum $\rho_W(\lambda)$ is obtained by dividing the white spectrum of the first liquid crystal module by the spectrum of the first backlight panel.

Step B3: obtaining a spectrum of a second backlight panel.

The second backlight panel is a backlight panel that is assembled together into a second liquid crystal module after the target liquid crystal display panel is manufactured, so that the second liquid crystal display panel can also be a backlight panel for a detection and an evaluation on the target liquid crystal display panel. The second liquid crystal display panel can also be referred to as a target backlight panel. The second backlight panel is usually produced by a backlight panel manufacturer, and obtaining the spectrum of the second backlight panel can be contacting a manufacturer of the second backlight panel to obtain spectrum data provided for the second backlight panel, or obtaining the second backlight panel and measuring the second backlight panel to obtain the spectrum data of the second backlight panel. The spectral data of the second backlight are noted as $S2(\lambda)$.

Step B4: calculating and obtaining a tristimulus value of the second liquid crystal module according to the transmission spectrum of the target liquid crystal display panel and the spectrum of the second backlight panel, wherein the second liquid crystal module includes the second backlight panel and the target liquid crystal display panel.

Through substituting the transmission spectrum $\rho(\lambda)$ of the target liquid crystal display panel and the spectrum $S(\lambda)$ of the second backlight panel into the above-mentioned calculation model (4), the tristimulus value of the second liquid crystal module can be calculated. Specifically, substituting the red transmission spectrum $\rho_R(\lambda)$ and the spectrum $S2(\lambda)$ into the above-mentioned calculation model (4) to obtain corresponding tristimulus values $X_R$, $Y_R$, and $Z_R$ when the second liquid crystal module displays red; substituting the green transmission spectrum $\rho_G(\lambda)$ and the spectrum $S2(\lambda)$ into the above-mentioned calculation model (4) to obtain corresponding tristimulus values $X_G$, $Y_G$, and $Z_G$ when the second liquid crystal module displays green; substituting the blue transmission spectrum $\rho_B(\lambda)$ and the spectrum $S2(\lambda)$ into the above-mentioned calculation model (4) to obtain corresponding tristimulus values $X_B$, $Y_B$, and $Z_B$ when the second liquid crystal module displays blue, and substituting the white transmission spectrum $\rho_W(\lambda)$ and the spectrum $S2(\lambda)$ into the above-mentioned calculation model (4) to obtain corresponding tristimulus values $X_W$, $Y_W$, and $Z_W$ when the second liquid crystal module displays white.

Step B5: obtaining the optical parameters corresponding to the target liquid crystal display panel according to the tristimulus value, so as to detect the optical properties of the target liquid crystal display panel.

The optical parameters of the target liquid crystal display panel include the corresponding brightness of the target liquid crystal display panel when displaying different colors, and the corresponding chrominance when displaying different colors, as well as a transmittance, a contrast ratio, and a color saturation of the target liquid crystal display panel.

Calculating and obtaining the tristimulus value data in step B4 is obtaining a corresponding red brightness $Y_R$ when displaying red, a corresponding green brightness $Y_G$ when displaying green, a corresponding blue brightness $Y_B$ when displaying blue, and a corresponding white brightness $Y_W$ when displaying white by the target liquid crystal display panel.

Substituting the corresponding tristimulus values $X_R$, $Y_R$, and $Z_R$ when the second liquid crystal module displays red into the above-mentioned mathematical relationship (1), so that the corresponding chrominance x-axis coordinates value $x_R=X_R/(X_R+Y_R+Z_R)$ and the corresponding chrominance y-axis coordinate value $y_R=Y_R/(X_R+Y_R+Z_R)$ when the target liquid crystal display panel is transmitted by the red light are obtained; substituting the corresponding tristimulus values $X_G$, $Y_G$, and $Z_G$ when the second liquid crystal module displays green into the above-mentioned mathematical relationship (1), so that the corresponding chrominance x-axis coordinates value $x_G=X_G/(X_G+Y_G+Z_G)$ and the corresponding chrominance y-axis coordinate value $y_G=Y_G/(X_G+Y_G+Z_G)$ when the target liquid crystal display panel is transmitted by the green light are obtained; and substituting the corresponding tristimulus values $X_B$, $Y_B$, and $Z_B$ when the second liquid crystal module displays blue into the above-mentioned mathematical relationship (1), so that the corresponding chrominance x-axis coordinates value $x_B=X_B/(X_B+Y_B+Z_B)$ and the corresponding chrominance y-axis coordinate value $y_B=Y_B/(X_B+Y_B+Z_B)$ when the target liquid crystal display panel is transmitted by the blue light are obtained. Furthermore, substituting the corresponding tristimulus values $X_W$, $Y_W$, and $Z_W$ when the second liquid crystal module displays white into the above-mentioned mathematical relationship (1), so that the corresponding chrominance x-axis coordinates value $x_W=X_W/(X_W+Y_W+Z_W)$ and the corresponding chrominance y-axis coordinate value $y_W=Y_W/(X_W+Y_W+Z_W)$ when the target liquid crystal display panel is transmitted by the white light are obtained.

Further, according to a brightness parameter and a chrominance parameter of the target liquid crystal display panel, the optical parameters such as a transmittance Tr, a color gamut NTSC, the contrast ratio, and the color saturation of the liquid crystal display panel are calculated.

According to the optical parameters of the target liquid crystal display panel, the optical properties of the target liquid crystal display panel are evaluated.

The following takes a display image at a gray scale of 255 as an example to compare the optical parameters measured by an optical property detecting method of a liquid crystal display panel provided in the prior art and the optical property detecting method of the liquid crystal display panel in an embodiment of the present application, so as to test the optical property detecting method of the liquid crystal display panel provided by an embodiment of the present application. Specifically, basic optical parameters of the target liquid crystal display panel measured by adopting the prior art, the basic optical parameters of the target liquid crystal display panel measured by adopting the optical property detecting method of the target liquid crystal display panel provided in an embodiment of the present application, and basic optical parameters obtained by an actual measurement of the target liquid crystal module are compared. The optical property detecting method of the liquid crystal display panel provided by the prior art refers to assembling the target liquid crystal display panel and a backlight panel produced by the panel manufacturer into a liquid crystal module for measurement, and the actual measurement of the target liquid crystal module refers to measuring the target liquid crystal device assembled with the target liquid crystal display panel and the target backlight panel.

Table 1 shows a comparison table of the basic optical parameters of the target liquid crystal display panel measured by the prior art, the basic optical parameters of the target liquid crystal display panel measured by the optical property detecting method provided in an embodiment of the present application, and the basic optical parameters obtained by the actual measurement of the target liquid crystal module.

TABLE 1

|  | Prior Art | | | | Present Application | | | | Actual Measurement | | | |
| --- | --- | --- | --- | --- | --- | --- | --- | --- | --- | --- | --- | --- |
|  | x | y | Y | Tr | x | y | Y | Tr | x | y | Y | Tr |
| R | 0.630 | 0.337 | 67 | 7.12% | 0.631 | 0.337 | 65 | 7.00% | 0.632 | 0.336 | 64 | 7.03% |
| G | 0.300 | 0.611 | 285 |  | 0.309 | 0.602 | 247 |  | 0.309 | 0.601 | 248 |  |
| B | 0.154 | 0.077 | 47 |  | 0.154 | 0.068 | 40 |  | 0.154 | 0.068 | 40 |  |
| W | 0.281 | 0.312 | 399 |  | 0.282 | 0.293 | 350 |  | 0.283 | 0.294 | 352 |  |
| NTSC |  | 68.4% | | | | 67.4% | | | | 67.6% | | |

Table 2 shows a difference comparison table of a difference between the basic optical parameters measured by the prior art and the basic optical parameters obtained by the actual measurement, and a difference between the basic optical parameters measured by the optical property detecting method provided in an embodiment of the present application and obtained by the actual measurement in Table 1.

TABLE 2

|   | Difference between Prior Art and Actual Measurement | | | | Difference between Present Application and Actual Measurement | | | |
|---|---|---|---|---|---|---|---|---|
|   | x | y | Y | Tr | x | y | Y | Tr |
| R | −0.002 | 0.001 | 3 | 0.1% | 0.001 | −0.001 | −1 | 0.03% |
| G | −0.009 | 0.010 | 37 |  | 0.000 | −0.001 | 1 |  |
| B | 0.000 | 0.009 | 7 |  | 0.000 | −0.001 | 0 |  |
| W | −0.002 | 0.018 | 47 |  | 0.001 | 0.001 | 2 |  |
| NTSC |  | 0.8% |  |  |  | 0.2% |  |  |

From data in Table 1 and Table 2, it can be seen that obvious differences are between the basic optical parameters of the target liquid crystal display panel measured by the prior art and the optical parameters obtained by actually measuring the target liquid crystal module. As for data obtained by measuring the basic optical parameters of the target liquid crystal display panel by the optical property detecting method provided in an embodiment of the present application is close to the data obtained by actually measuring the target liquid crystal module, and the difference is extremely small. Therefore, compared with the prior art, the present application increases an accuracy of measuring the optical parameters of the target liquid crystal display panel, reduces the measurement error, further increases an accuracy of evaluating the optical properties of the target liquid crystal display panel, and increases a development yield of the liquid crystal display panel.

In sum, an embodiment of the present application provides the optical property detecting method of the liquid crystal display panel. By establishing the simulation calculation model and utilizing the simulation calculation model, the optical property detecting method can calculate the optical parameters of the target liquid crystal display panel, and detect and evaluate the optical properties of the target liquid crystal display panel under the condition that the spectrum of the target backlight panel is known, without obtaining the spectrum of the target backlight panel, and transporting the target liquid crystal display panel for assembly and measurement with the target backlight panel, which simplifies the optical property detecting process of the liquid crystal display panel, reduces the detecting time of the optical properties of the liquid crystal display panel, reduces the measurement error, and increases the development efficiency of the liquid crystal display panel.

The optical property detecting method of the liquid crystal display panel provided by the present application is described in detail above, the specific examples of this document are used to explain principles and embodiments of the present application, and the description of embodiments above is only for helping to understand the present application. Meanwhile, those skilled in the art will be able to change the specific embodiments and the scope of the present application according to the idea of the present application. In the above, the content of the specification should not be construed as limiting the present application.

Above all, the content of the specification should not be the limitation of the present application.

What is claimed is:

1. An optical property detecting method of a liquid crystal display panel for detecting an optical property of a target liquid crystal display panel, the optical property detecting method comprises:
    measuring a spectrum of a first backlight panel and a spectrum of a first liquid crystal module, wherein the first liquid crystal module comprises the first backlight panel and the target liquid crystal display panel;
    calculating and obtaining a transmission spectrum of the target liquid crystal display panel according to the spectrum of the first backlight panel and the spectrum of the first liquid crystal module;
    obtaining a spectrum of a second backlight panel;
    calculating and obtaining a tristimulus value of a second liquid crystal module according to the transmission spectrum of the target liquid crystal display panel and the spectrum of the second backlight panel, wherein the second liquid crystal module comprises the second backlight panel and the target liquid crystal display panel; and
    obtaining a plurality of optical parameters corresponding to the target liquid crystal display panel according to the tristimulus value, so as to detect an optical property of the target liquid crystal display panel.

2. The optical property detecting method according to claim 1, wherein a step of measuring the spectrum of the first backlight panel and the spectrum of the first liquid crystal module comprises:
    measuring the spectrum of the first backlight panel; and
    measuring a corresponding spectrum of the first liquid crystal module when displaying a target color.

3. The optical property detecting method according to claim 2, wherein a step of calculating and obtaining the transmission spectrum of the target liquid crystal display panel according to the spectrum of the first backlight panel and the spectrum of the first liquid crystal module comprises:
    dividing the corresponding spectrum of the first liquid crystal module when displaying the target color by the spectrum of the first backlight panel to obtain a corresponding transmission spectrum of the target liquid crystal display panel when displaying the target color.

4. The optical property detecting method according to claim 3, wherein the target color comprises red, green, and blue, and a step of dividing the corresponding spectrum of the first liquid crystal module when displaying the target color by the spectrum of the first backlight panel to obtain the corresponding transmission spectrum of the target liquid crystal display panel comprises:
    dividing the corresponding spectrum of the first liquid crystal module when displaying red by the spectrum of the first backlight panel to obtain a corresponding red transmission spectrum of the target liquid crystal display panel when being penetrated by red light;
    dividing the corresponding spectrum of the first liquid crystal module when displaying green by the spectrum of the first backlight panel to obtain a corresponding green transmission spectrum of the target liquid crystal display panel when being penetrated by green light; and
    dividing the corresponding spectrum of the first liquid crystal module when displaying blue by the spectrum of the first backlight panel to obtain a corresponding blue transmission spectrum of the target liquid crystal display panel when being penetrated by blue light.

5. The optical property detecting method according to claim 4, wherein the target color comprises red, green, and blue, and the step of dividing the corresponding spectrum of the first liquid crystal module when displaying the target color by the spectrum of the first backlight panel to obtain the corresponding transmission spectrum of the target liquid crystal display panel further comprises:
dividing the corresponding spectrum of the first liquid crystal module when displaying white by the spectrum of the first backlight panel to obtain a corresponding white transmission spectrum of the target liquid crystal display panel when being penetrated by white light.

6. The optical property detecting method according to claim 3, wherein a step of calculating and obtaining the tristimulus value of the second liquid crystal module according to the transmission spectrum of the target liquid crystal display panel and the spectrum of the second backlight panel comprises:
substituting the transmission spectrum of the target liquid crystal display panel and the spectrum of the second backlight panel into a calculation model, and calculating to obtain the tristimulus value of the second liquid crystal module; wherein the tristimulus value comprises a red primary color stimulus value, a green primary color stimulus value, and a blue primary color stimulus value, and the calculation model is:

$$X = K \int_\lambda S(\lambda) \cdot \rho(\lambda) \cdot \bar{x}(\lambda) d\lambda;$$

$$Y = K \int_\lambda S(\lambda) \cdot \rho(\lambda) \cdot \bar{y}(\lambda) d\lambda; \text{ and}$$

$$Z = K \int_\lambda S(\lambda) \cdot \rho(\lambda) \cdot \bar{z}(\lambda) d\lambda;$$

wherein, the X is the red primary color stimulus value, the Y is the green primary color stimulus value, the Z is the blue primary color stimulus value, the K is a known coefficient, the $S(\lambda)$ is the spectrum of the second backlight panel, the $\rho(\lambda)$ is the transmission spectrum of the liquid crystal display panel, the $\lambda$ is the wavelength, and the $\bar{x}(\lambda)$, $\bar{y}(\lambda)$, and $\bar{z}(\lambda)$ are CIE1931 standard colorimetric observer color matching functions.

7. The optical property detecting method according to claim 6, wherein the step of calculating and obtaining the tristimulus value of the second liquid crystal module according to the transmission spectrum of the target liquid crystal display panel and the spectrum of the second backlight panel comprises:
substituting the red transmission spectrum of the target liquid crystal display panel and the spectrum of the second backlight panel into the calculation model, and obtaining a corresponding tristimulus value of the second liquid crystal module when displaying red;
substituting the green transmission spectrum of the target liquid crystal display panel and the spectrum of the second backlight panel into the calculation model, and obtaining a corresponding tristimulus value of the second liquid crystal module when displaying green; and
substituting the blue transmission spectrum of the target liquid crystal display panel and the spectrum of the second backlight panel into the calculation model, and obtaining a corresponding tristimulus value of the second liquid crystal module when displaying blue.

8. The optical property detecting method according to claim 6, wherein the step of calculating and obtaining the tristimulus value of the second liquid crystal module according to the transmission spectrum of the target liquid crystal display panel and the spectrum of the second backlight panel further comprises:
substituting the white transmission spectrum of the target liquid crystal display panel and the spectrum of the second backlight panel into the calculation model, and obtaining a corresponding tristimulus value of the second liquid crystal module when displaying white.

9. The optical property detecting method according to claim 6, wherein a step of obtaining the plurality of optical parameters corresponding to the target liquid crystal display panel according to the tristimulus value comprises:
calculating a value of a luminance parameter and a value of a chrominance parameter according to a mathematical relationship between the tristimulus value and the luminance parameter and the chrominance parameter, and the mathematical relationship is:

$$x = X/(X + Y + Z); \text{ and}$$

$$y = Y/(X + Y + Z);$$

wherein the Y is both the green primary color stimulus value and the luminance parameter, the x is a coordinate parameter of an x-axis of a chrominance, and the y is a coordinate parameter of a y-axis of the chrominance.

10. The optical property detecting method according to claim 9, wherein after a step of calculating the value of the luminance parameter and the value of the chrominance parameter according to the mathematical relationship between the tristimulus value and the luminance parameter and the chrominance parameter, the optical property detecting method further comprises:
obtaining a transmittance, a contrast ratio, a color saturation, and a color gamut of the liquid crystal display panel according to a value of a brightness parameter and a value of the chrominance parameter, so as to detect the optical property of the liquid crystal display panel.

11. The optical property detecting method according to claim 1, wherein a step of obtaining the spectrum of the second backlight panel comprises:
directly obtaining data of the spectrum of the second backlight panel; or
measuring the second backlight to obtain the data of the spectrum of the second backlight panel.

* * * * *